United States Patent Office 2,917,940
Patented Dec. 22, 1959

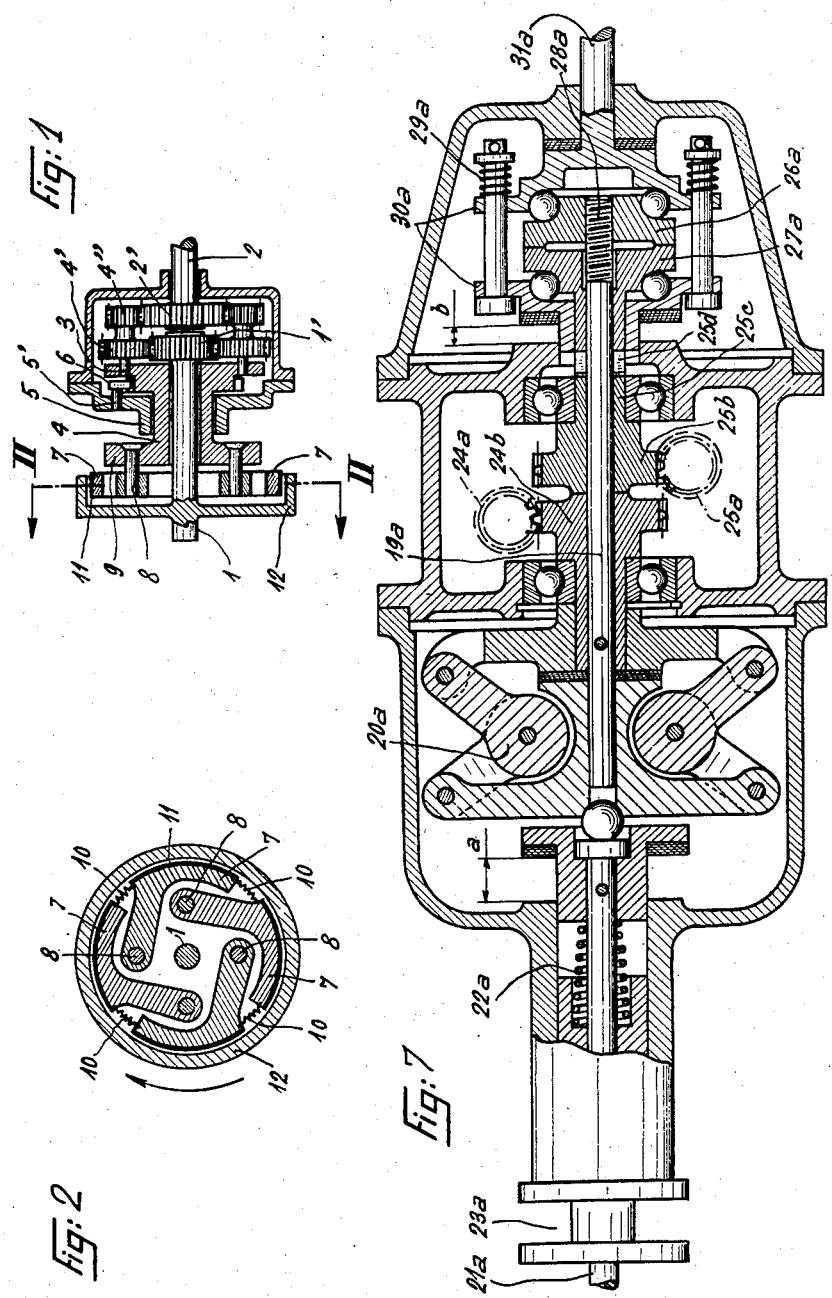

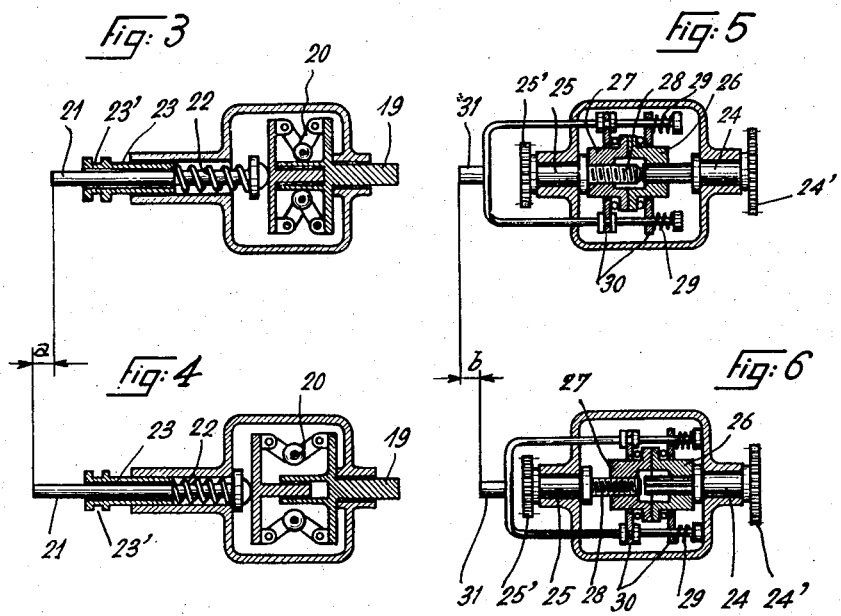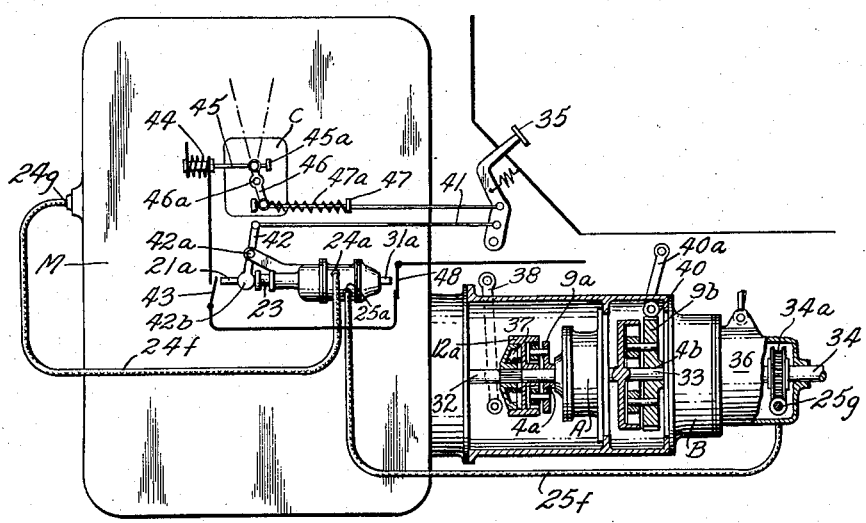

2,917,940
GEAR-CHANGING DEVICES
Paul J. Voreaux, Saint-Cloud, France

Application February 15, 1957, Serial No. 640,360

Claims priority, application France February 22, 1956

6 Claims. (Cl. 74—472)

The present invention relates to speed-changing gears which are capable of general application, but which are more especially intended for use in automobile vehicles.

It is known that certain gear-changing devices, especially those known as planetary gears, comprise three coaxial shafts; a primary shaft rigidly coupled to a driving device, a secondary shaft coupled to a driven device and an intermediate shaft coupled to a supporting or reaction member. With a device of this kind, it is possible to cause the secondary shaft to rotate either at a low speed with respect to the primary shaft, and in the same direction as that shaft, when the intermediate shaft is held fixed, or at the same speed as the primary shaft by direct engagement, when the intermediate shaft is engaged with the primary shaft or with the secondary shaft.

It has already been proposed to provide the intermediate shaft of a reducing gear of this kind, on the one hand with a centrifugal device, bob-weights for example, which couples the intermediate shaft to the primary shaft or the secondary shaft above a certain speed, and on the other hand, with a device such as a free wheel, which prevents the intermediate shaft from rotating in the opposite direction to the normal direction of rotation.

The reducing gear thus completed ensures the automatic change from direct drive to lower gear, below a certain engine speed.

The present invention consists in combining the speed-reducing gear thus modified, or an equivalent type, with a release device which produces the automatic change from low gear to top gear by slowing down the engine between certain engine speeds. This release may be preferably associated with an anti-release which prevents the action of the release device during running in top gear.

Finally, in a particularly advantageous form of the invention, two or a greater number of speed-reducing gears, arranged in series, are combined with a release and possibly with other accessory devices so as to produce an automatic gear-change mechanism with four or a greater number of speeds, in which both changing-up and changing-down through the gears is carried out automatically.

The description which follows below with reference to the accompanying drawings (which are given by way of example only and not in any sense by way of limitation) will make it quite clear how the invention may be carried into effect, the special features which are brought out, either in the text or in the drawings, being understood to form a part of the said invention.

Fig. 1 shows in cross-section elevation a speed-reducing gear which passes automatically from top gear to lower gear.

Fig. 2 is a cross-section taken along the line II—II of Fig. 1.

Figs. 3 and 4 show a release device in accordance with the invention, in its two extreme positions.

Figs. 5 and 6 show in its two extreme positions the device which is hereinafter termed the anti-release device, intended to suppress the action of the release during engagement of top gear.

Fig. 7 shows a form of embodiment which combines in a single constructive assembly the release and the anti-release devices.

Figure 8 illustrates diagrammatically in side elevation and partially in section an installation in a motor vehicle embodying the principles of the present invention and assembling the devices illustrated in the earlier figures of the drawing.

There will be recognized from Fig. 1 the general aspect of an epicyclic speed-reduction gear: the primary shaft 1 is coupled to the engine (not shown, on the left-hand side of the figure). Its sun wheel 1' engages with the two-stage satellites or satellites with a double set of teeth 4', 4", which themselves engage with the output sun wheel 2' of the secondary shaft or driven shaft 2.

The shafts 3 rotatably carrying the satellites are fixed in the hollow shaft assembly 4 which is termed the intermediate shaft or reaction shaft.

The shaft assembly 4 is mounted freely rotatable on the shaft 1, but it can only rotate in one direction due to a device 6 such as a free wheel, ratchet or other means having the same function, which prevents it from turning in the direction opposite to the common direction of rotation of the shafts 1 and 2. This immobilization is obtained by the reaction of the satellites on the sun wheel 2', transmitted by the free wheel 6, which is supported on the frame 5 by a member which is diagrammatically shown in the drawing by the spindle 5' fixed to the frame 5.

In the permitted direction of rotation, the intermediate shaft 4 drives the weight-heads 7 (four in the case of Fig. 2) fixed to a flange 9 of the shaft 4. Due to the action of centrifugal force, the weight-heads pivot about their pintles 8 in opposition to the tension springs 10, and their friction surfaces 11 comes into contact with the internal surface of a ring or fly-wheel 12 which is rigidly fixed to the driving shaft. It will be noted that the springs 10 which bring the weight-head closer together, serve only to prevent the friction of the latter due to the effect of their weight, when the intermediate shaft is stationary. When the secondary shaft is rotating at reduced speed with respect to the primary shaft, if the accelerator is released, that is to say if the action of the engine is reduced, the latter acts as a retarding means, the reaction on the shaft 4 changes in direction, this shaft begins to rotate, the centrifugal action of the weight-head 7 causes the shafts 1 and 4 to become engaged, and top gear is obtained between the primary and secondary shafts.

If the resisting torque increases and if the speed of the engine decreases, the change from top gear to a lower gear will be effected automatically when the torque of engagement is no longer sufficient to balance the reaction torque.

This device has the advantage that it provides a clean change from one gear to another without any prolonged slipping of the clutch being possible since, during the period of slip, the whole of the mechanism is in unstable equilibrium.

It may be an advantage to control at will the change-over from top gear to a lower gear, and the intermediate shaft may be arranged so as to be subjected to the action of an external brake. It is also possible to interrupt momentarily the coupling by weight-heads of the intermediate shaft with the primary or secondary shaft by means of an external clutch which provides a controlled change from top gear to a lower gear. Both of these features are illustrated and described in connection with Figure 8.

The speed-reducing gear described above is automatic for the change-over from top gear to a lower gear, but it must be actuated by the accelerator or control member of the engine when changing from a low gear to top gear. In accordance with the invention, this passage from low gear to top gear is made automatic by means of a "release" device which applies a retarding effect to the engine between certain speeds of the said engine.

Figs. 3 and 4 show a preferred embodiment of a release device:

The shaft 19 rotates at a speed having a constant ratio with the speed of the engine. It drives in rotation weights 20 which tend to move away from the axis of rotation due to the effect of centrifugal force, thus pushing a rod 21, the movement of which is opposed by a spring 22.

In Fig. 3, the strength of the spring 22 is greater than the centrifugal action, and the weights 20 are in their closest position to the axis; when the engine reaches the speed selected for the release, the centrifugal force just exceeds the strength of the spring, the masses move away from the axis of rotation (which still further increases the centrifugal action) and reach the extreme position shown in Fig. 4, which displaces the rod 21 by the length $a$. This movement is utilized to retard the engine, especially by cutting-off its supply, either directly or by the intermediary of a contact actuating an electro-magnet, or of a valve actuating a hydraulic push-rod or by any other means.

The engine being under retardation, its speed falls, the centrifugal action on the weights 20 also decreases and becomes smaller than the action on the spring; the weights 20 return closer to the axis and again take up the position shown in Fig. 3, thus restoring the engine to normal running. If at this moment the intermediate shaft has reached a speed sufficient for the engagement to be effected in top gear, the change-over from low gear to top gear is carried out automatically.

In order to prevent the reduction of the speed of the secondary shaft to the speed of re-engagement, this speed will be chosen to be at least equal to the speed reached by the secondary shaft at the moment of release.

Instead of being effected by a spring, the action opposing the centrifugal action could be carried out by other means, and especially by a piston subjected to the pressure of a fluid.

In all cases, if the opposing force is constant, the release is always effected at the same engine speed. It may however be desired to vary this speed in dependence on the load on the engine. To this end, the tension of the spring 22 can be modified by displacement of its fixed point, that is to say of the member 23, the position of which is determined by a fork (not shown) acting in the groove 23'. When the pressure of a fluid is used instead of a spring, the speed of release can be varied by modifying the pressure of the fluid which acts on the piston.

The control of the device which regulates the release can be made conjoint with advantage with the control of the accelerator or controlling member of the engine, in order to increase the speed of release as a function of the engine load.

In top gear, the retarding action applied to the engine may be a source of difficulty and in this case, it is necessary to suppress its action, this being effected by the anti-release device, of which one form of embodiment is shown in Figs. 5 and 6. The shaft 24 is coupled to the driving shaft by the pinion 24', the shaft 25 is coupled to the outgoing shaft of the reducing gear by the pinion 25'. The transmissions are selected in such manner that the shaft 25 rotates more rapidly than the shaft 24 in top gear and less rapidly than the said shaft in low gear. The result is that, depending on the case, the shaft 25 rotates in one direction or in the other, relatively to the shaft 24.

The plate 26 is driven in rotation by the shaft 24 by means of longitudinal splines which permit the plate to slide on the shaft. The plate 27 is driven by the shaft 25, to which it is coupled by the screw 28 which permits of a certain relative lateral movement of the two members. The arrangement adopted above could moreover be reversed: the shaft end 24 coupled to the engine shaft being driven by a screw, and the shaft end 25 coupled to the outgoing shaft being driven through longitudinal splines.

The plates 26 and 27 are constantly pressed against each other by means of springs 29 supported against washers 30 which are mounted on balls. These washers cannot turn but can only move in the direction of the shaft and actuating a rod 31.

In Fig. 5, the relative movement of the shaft 25 with respect to the shaft 24 is effected in the direction of the hands of a watch, and the assembly of the plates 26, 27, 30 and the rod 31 takes up the extreme position shown.

In Fig. 6, the relative movement of the shaft 25 with respect to the shaft 24 is effected in a direction opposite to that of the hands of a watch, and the assembly 26, 27, 30 and 31 takes up the position shown.

To sum up, when the shaft 25 rotates faster than the shaft 24, that is to say when the gear is in top gear, the rod 31 occupies one of the extreme positions shown in the figures; when the shaft 25 turns less rapidly than the shaft 24, that is to say when a lower gear is engaged, the rod 31 occupies its other extreme position. The displacement $b$ of the rod 31 is used in top gear to prevent any retarding action on the engine by the release device, either directly or by electric or hydraulic servo-control.

Fig. 7 shows an assembly of small overall size which combines the release device on the left-hand side and the anti-release device on the right.

These constitutive members have been given the same reference numbers (with the index $a, b \ldots$) as in Figs. 3 to 6. It will only be added that the speed of the engine is transmitted to the shaft 19a by the helical gears 24a, 24b, whilst the outgoing shaft of the gear is coupled by the gears 25a, 25b to a sleeve 25c which drives the plate 27a through dogs or grooves 25d, whilst leaving the possibility of longitudinal movement, which takes place when, as a result of the different speeds, the shaft 19a is screwed into or unscrewed out of the plate 26a.

The displacement $a$ of the shaft 21a controls the retarding of the engine, and the displacement $b$ of the rod 31a puts the release device out of action.

Attention is directed to the small dimensions of this assembly which is intended to actuate members having small inertia, which action could moreover be effected by servo-control means.

Figure 8 shows two gear change devices A and B, with a release-antirelease unit, incorporated in the known members (shown diagrammatically) of an automotive vehicle, the engine of which is shown at M and the carburetor at C, actuated by the accelerator or gas pedal 35. The reduction gear A (as already indicated) has a clutch 37 of known type which makes it possible to disconnect the engine when desired and to eliminate the connection by inertia blocks of the primary shaft 32 with the intermediate shaft 4a. This clutch actuated by the lever 38 therefore assures the controlled passage from direct drive to third gear. On the periphery of the flange 9b of the intermediate shaft 4b of the reducer B there acts (as previously described) an outer brake 40 of any desired type actuated by lever 40a, which makes it possible to lock the intermediate shaft 4b so as to cause the reducer B to pass from direct engagement to low speed and maintain it there if necessary, which corresponds to the control passage of the vehicle from third to second speed.

The release-antirelease device shown in Figure 8 is the same previously described herein in connection with Figure 7. The flexible shafts 24f and 25f terminate there at 24a and 25a, the first of these shafts being connected at 24g to the shaft of the engine and the latter at 25g to the transmission shaft 34, the gear ratios being selected in the known manner so that in direct drive the flexible shaft 25f turns more rapidly than the flexible shaft 24f, as already described.

The force of the spring 22a (Figure 7) of the release varies with the position of the accelerator pedal 35, connected by a rod 41 to a lever 42 articulated at a fixed point 42a and the end 42b of which (being of forked shape) acts on the part 23 of the release, the action of which is thus delayed for a longer time the more the engine is fed and provides a very high torque, as pointed out above.

The cutting of the feeding of the engine by the release is effected by acting, preferably electrically, as above noted, on the gas control lever 46 of the carburetor C against the action of a spring which connects said lever to the gas pedal 35. From Figure 8 it can be seen that when the release operates, its rod 21a upon emerging, closes a switch 43 which is normally open and located in a circuit containing an electro-magnet 44; when the latter is energized, it attracts an armature connected to a rod 45 provided with a head 45a which pulls towards the top of lever 46, pivoting at 46a, which cuts off the gas. This pull is still possible since the pedal 35 acts on the lever 46 only via a spring 47a resting against the top 47. Furthermore, when the antirelease operates, its rod 31a upon emerging opens a switch 48 which is normally closed so that any current feed is interrupted.

The operation of this assembly for a given load is as follows:

By construction: the ratio $n1$ of the gears in the reduction gear A between top gear and low gear is smaller than the corresponding ratio $n2$ in the reduction gear B. On the other hand, the speed $v1$ at which the top gear in A is changed (that is to say the change-down from top gear to low gear) is higher than the speed $v2$ of changing down in B, under the action of the same driving torque.

If the release device is adjusted so as to put the engine under retarding action at the speed W, the speed at which the engine again comes into action as a supplier of useful power should be at least equal to the speed $$\frac{W}{n1}$$

which is itself greater than $v1$.

During starting-up, the two reduction gears A and B are in low gear and the total ratio of reduction is $n1 \times n2$. This is the first gear.

As the speed of the engine increases, the release device will apply a retarding action to the engine when the latter reaches the speed W. The speed of the outgoing shaft of the reduction gear A and intake shaft of the reduction gear B will then be $$\frac{W}{n1}$$

and the speed of the outgoing shaft of the reduction B will be $$\frac{W}{n1 \times n2}$$

The reactions then change direction in the reduction gears A and B, and the intermediate or reaction shafts begin to rotate.

By construction however, the inertia of the reaction shaft and of the clutch weight-heads of the reduction gear A is very much smaller than the inertia of the members coupled to the secondary shaft of this same reduction gear. Thus, when the speed of the engine falls due to the release device, the speed of the reaction device of the reduction gear A increases much more quickly than the speed of the reaction device of the reduction gear B. When the release device restores the useful operation of the engine, if the reaction device of the reduction gear A has reached a speed greater than $b1$, the drive is effected in top gear in the reduction gear A. If the speed of the reaction device of the reduction gear B is at this moment less than $v2$, the drive is effected in low gear in the reduction gear B. The total gear ratio will then be $n2$. This is the second gear.

As the engine speed again increases, it will again be put under retarding by the release device when it reaches the speed W. The speed of the outgoing shaft of A and the intake shaft of B is then W and the speed of the outgoing shaft of B is $$\frac{W}{n2}$$

which is greater than $v2$. As the speed of the engine falls, the reaction shaft of the reduction gear B starts to rotate. If, when the release device restores the useful operation of the engine, the reaction shaft of B has reached the speed $v2$, it will put B in top gear while accentuating the fall in speed of the engine. On the other hand, the top gear will be disengaged in A when the speed has fallen sufficiently low in this reduction gear.

The engine will then increase in speed until the reduction gear A is in low gear and the reduction gear B is in top gear.

The total ratio of reduction is then $n1$. This is the third gear.

When the engine speed increases until it has again reached the speed W, it will be retarded by the release device. The outgoing speed of A, of intake and output of B is then $$\frac{W}{n1}$$

The reduction gear A will pass into top gear and the reduction gear B will remain in that gear, since the speed $$\frac{W}{n1}$$

is greater than $v1$ and a fortiori than $v2$.

The whole of the transmission is then in top gear. This is the fourth gear, for which the anti-release device becomes operative.

It has just been seen how the gears are automatically changed from first to fourth gear. Changing down from fourth gear to first gear is effected as follows:

When the engine speed has fallen to $v1$, the top gear will disengage in the reduction gear A which will pass into low gear, and the transmission will pass into third gear. This gear will be maintained until the top gear disengages in the reduction gear B. The input torque in B then being the engine torque multiplied by $n1$ (without taking account of the efficiency) the disengagement of the top gear in B will take place at a speed in the vicinity of $v2 \times \sqrt{n1}$ of the outgoing shaft of A, or at a speed of the engine in the vicinity of $v2 \times \sqrt{n1} \times n1$.

The engine speed then increases up to the speed W whilst the reaction shaft of the reduction gear B tends to become stationary. At this moment, the reduction gear A passes into top gear, and the reduction gear B into low gear; the transmission passes into second gear.

When the engine speed has fallen down to $v1$, the top gear will disengage in the reduction gear A. As the reduction gears A and B are both in low gear, the transmission passes into first gear.

In more general terms, automatic changes of gear can be obtained by the combination of a number of reduction gears with a release device and an anti-release device.

It will of course be understood that modifications may be made to the forms of embodiment which have just been described, in particular by the substitution of equivalent technical means, without thereby departing from the spirit or from the scope of the present invention.

What I claim is:

1. An automatic gear changing device for an engine having a drive shaft and means for regulating the fuel supply, said device comprising a speed reduction gearing of the planetary type having a primary or input shaft operatively connected with the engine drive shaft, a secondary or output shaft, and an intermediate rotatable fulcrum shaft, said three shafts being coaxial and operatively connected in the conventional way for this type of gear, centrifugal clutch means carried by said intermediate fulcrum shaft for coupling the latter at a predetermined speed to said primary shaft, a one-way brake means in the device and operatively connected with said intermediate shaft to restrain said intermediate shaft against rotation in one direction and enable the latter to act in its function as a fulcrum or reaction member, while being free for rotation in the other direction, whereby to insure that below a predetermined engine speed an automatic change from top gear ratio to a lower gear ratio will occur; a release device having an input member driven from the engine drive shaft, a control element in said release device operatively connected with the fuel supply regulating means and actuated by the speed of its input member, to move in a direction to decrease the engine fuel feed at a predetermined engine speed and to move in the opposite direction to re-establish that feed at a predetermined lower engine speed, thus altering the relative speed of the primary and secondary shafts of the reduction gear whereby automatic change is also effected from a lower gear ratio to top gear ratio.

2. A gear changing device in accordance with claim 1 in which the input member of said release device rotating at a constant ratio with the engine drive shaft carries at least one weight adapted to move outwardly under the influence of centrifugal force, and in which resilient restraining means is provided in said release device acting upon said weight in opposition to said centrifugal force, and also means for connecting said weights with said control element of the release device which is operatively connected with the said engine fuel regulator.

3. A gear changing device as set forth in claim 2 in which means are provided in said release device for adjusting said resilient restraining means to select the engine speed at which said release device is effective.

4. The gear changing device as set forth in claim 1 in which there is provided an anti-release device operatively connected with said release device and comprising two input members, one driven by the engine drive shaft and the other by the secondary or output shaft of the speed reducing gear, one of said input members adapted to rotate faster than the other in top gear ratio and slower in low gear ratio, and a member actuatable by the difference in speed of rotation of the two last named members to suppress the action of the release device when the member driven by the secondary or output shaft of the speed reducing gear is rotating faster than the member driven by the engine driven shaft, as in top gear ratio.

5. A gear-changing device as claimed in claim 4 wherein the release device and the anti-release device are arranged coaxially within the same casing.

6. An automatic gear changing device for an engine having a drive shaft and means for regulating the fuel supply, said gear changing device comprising a pair of speed reduction gears of the planetary type operatively connected with each other in series, the first of said gears having a primary or input shaft operatively connected with the engine drive shaft, a secondary or output shaft, and an intermediate or fulcrum shaft, said shafts being coaxially arranged and operatively connected in the conventional way for this type of gear; centrifugal clutch means carried by said intermediate fulcrum shaft for coupling the latter at a predetermined speed to said primary shaft, a one-way brake means in the device and operatively connected with said intermediate shaft to restrain said intermediate shaft against rotation in one direction and enable the latter to act in its function as a fulcrum or reaction member, while being free for rotation in the other direction, whereby to insure that below a predetermined engine speed an automatic change from top gear ratio to a lower gear ratio will occur; the second speed reduction gear comprising similarly connected and arranged primary, secondary and intermediate shafts, clutch, and brake means; and means for operatively coupling the secondary or output shaft of said first gear to the primary or input shaft of said second gear; the selective controlling of the second gear insuring a change from said lower gear ratio to a still lower one; a release device having an input member driven from the engine drive shaft, a control element in said release device operatively connected with said fuel supply regulating means and actuated speed of said input member, to move in a direction to decrease the engine fuel feed at a predetermined engine speed, and to re-establish that feed at a predetermined lower speed, thus altering the relative speed of the primary and secondary shafts of the reduction gearings, whereby automatic change is also effected in an increasing gear ratio direction; and an anti-release device operatively connected with said release device and comprising two input members, one driven by the engine drive shaft and the other by the secondary or output shaft of the speed reducing gear, one of said input members adapted to rotate faster than the other in top gear ratio and slower in low gear ratio, and a member actuatable by the difference in speed of rotation of the two last named members to suppress the action of the release device, when the member driven by the secondary or output shaft of the speed reducing gear is rotating faster than the member driven by the engine driven shaft, as in top gear ratio, whereby four speed ratios are attainable.

References Cited in the file of this patent

UNITED STATES PATENTS

| | | |
|---|---|---|
| Re. 20,824 | Maybach | Aug. 9, 1938 |
| 1,843,193 | Banker | Feb. 2, 1932 |
| 1,911,599 | Bloxsom | May 30, 1933 |
| 2,701,974 | Miller | Feb. 15, 1955 |